United States Patent [19]

Cordier

[11] Patent Number: 5,429,479
[45] Date of Patent: Jul. 4, 1995

[54] STAGE OF VANES FREE AT ONE EXTREMITY

[75] Inventor: Jean-Christophe M. Cordier, Paris, France

[73] Assignee: Societe Nationale d'Etude et de Construction de Moteurs d'Aviation "Snecma", Paris, France

[21] Appl. No.: 201,013

[22] Filed: Feb. 24, 1994

[30] Foreign Application Priority Data

Mar. 3, 1993 [FR] France ................ 93 02431

[51] Int. Cl.⁶ .............................................. F01D 1/02
[52] U.S. Cl. ............................................... 415/209.3
[58] Field of Search ................. 415/119, 209.3, 209.2

[56] References Cited

U.S. PATENT DOCUMENTS

| | | |
|---|---|---|
| 2,772,854 | 12/1956 | Anxiounaz . |
| 3,104,093 | 9/1963 | Craig et al. . |
| 3,172,641 | 3/1965 | John et al. ................ 415/209.3 |
| 3,326,523 | 6/1967 | Bobo ......................... 415/209.3 |
| 3,867,066 | 2/1975 | Canova et al. ............. 415/209.3 |
| 4,836,745 | 6/1989 | Hourmouziadis ............ 415/119 |
| 5,083,900 | 1/1992 | Carletti et al. ............ 415/209.3 |

FOREIGN PATENT DOCUMENTS

| | | |
|---|---|---|
| 0017306 | 10/1980 | European Pat. Off. . |
| 2330276 | 5/1977 | France . |
| 0272459 | 9/1927 | United Kingdom ............ 415/209.3 |
| 0572859 | 10/1945 | United Kingdom ............ 415/209.3 |
| 0599391 | 3/1948 | United Kingdom ............ 415/209.3 |
| 0638103 | 5/1950 | United Kingdom ............ 415/209.3 |
| 660383 | 11/1951 | United Kingdom . |
| 777955 | 7/1957 | United Kingdom . |

*Primary Examiner*—Edward K. Look
*Assistant Examiner*—Mark Sgantzos
*Attorney, Agent, or Firm*—Oblon, Spivak, McClelland, Maier & Neustadt

[57] ABSTRACT

A stage of vanes, the vanes being embedded in a ring wherein the stage includes a ferrule concentric with the ring, an outer portion of the vanes having a free extremity which extends into a gas stream. A base portion of the vanes extends beyond the ring with respect to the gas stream and have a respective block located at an opposite end, the block rubbing against the ferrule. One of the block and a surface of the ferrule having a coating for reducing friction and a dampening material fills a space between the ring and a surface of the ferrule. Each block may include covering regions which rub against a neighboring block and the blocks may also have a friction surface formed with grooves. In addition, the stage may include a plurality of springs wherein the springs bias the block against the ferrule.

10 Claims, 3 Drawing Sheets

STAGE OF VANES FREE AT ONE EXTREMITY

FIELD OF THE INVENTION

The invention concerns a stage of vanes free at one extremity.

BACKGROUND OF THE INVENTION

These vanes, also known as projecting vanes, oppose vanes whose extremities are joined together by a holding ring. This latter conception is disadvantageous in that the holding ring is heavy and must not encumber the gas flow vein occupied by the vanes, which requires that it is housed in an annular hollow space of the adjacent piece, generally a rotor, for delimiting the vein which thus assumes a more complicated shape. But the projecting vanes do have the drawback of bending much more easily and thus vibrate during functioning of the machine of which they form part for permanent reasons, such as the characteristics of the flow of gases, or accidental causes, such as the passage of a foreign body, such as a bird. The vibrations affect the functioning and efficiency and may even destroy the vanes. This is why it has been suggested to more solidly fix the vanes by extending them at their base portion embedded in a ring for delimiting the flow vein beyond this ring and by embedding the vanes in a second ring concentric to the first one or by embedding the base portion situated beyond the ring in a dampening material.

SUMMARY OF THE INVENTION

The invention concerns a slightly different conception in which the base portion, extended beyond the embedding ring or fixing ring, is ended by a block rubbing on a ferrule surface concentric to the ring.

Thus, an assembly is obtained without excessive rigidity where the vibrations are significantly dampened via rubbing of the block of the ferrule surface.

BRIEF DESCRIPTION OF THE DRAWINGS

There now follows a description of the some of the embodiments, given by way of non-restrictive illustration, of the invention, with reference to the accompanying figures wherein.

DESCRIPTION OF THE PREFERRED EMBODIMENTS

Figure 1:
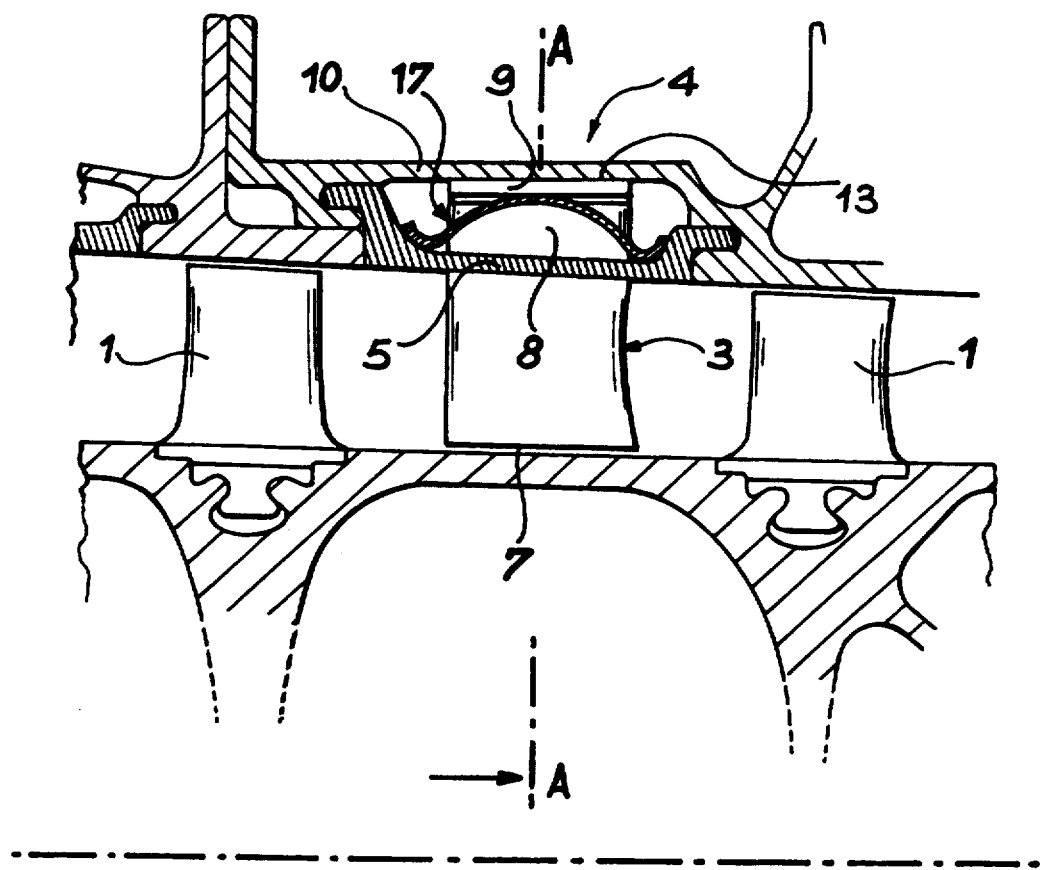
FIG. 1 is an axial view of a compressor.
Figure 1:
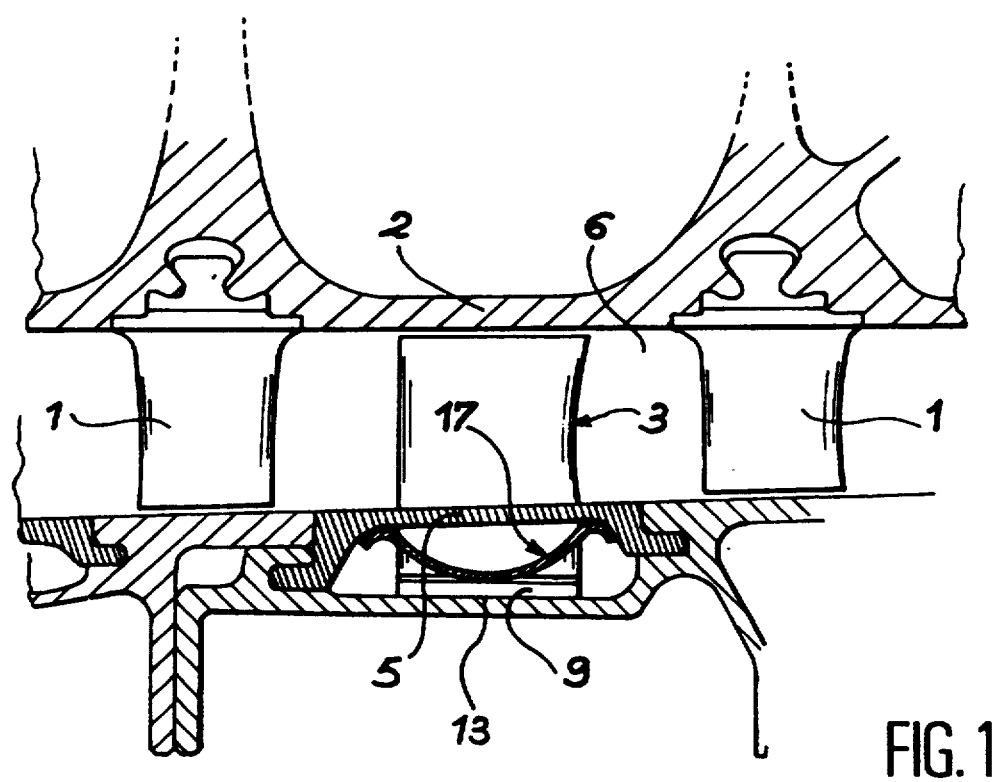

The invention is primarily intended to be used for fixed vanes for distributor sections of turbo-engines, such as compressors (FIG. 1). These distributor rectifying vanes 3 are disposed in circular stages which alternate with stages of vanes 1 fixed to a rotor 2. They are fixed to a stator 4 via a radially external base portion and are embedded in a ring 5 common to each stage by being slid into slits of the ring 5 and then welded, soldered or fixed to it by another device. They extend into the gas flow stream 6 almost as far as the rotor 2, which is smooth and cylindrical in front of them, a shape which proves to be advantageous for production, and are ended more specifically by a free extremity 7.

The embedding of the vanes 3 in the ring 5 is, however, insufficient to sufficiently reduce the vibrations in that the ring 5 is thin and relatively slightly rigid. The vanes 3 can easily bend in the direction of the circumference of the stage according to modes where the embedding point is a vibration node point. This is why the vanes 3 include a base portion 8 opposite the free extremity 7 and which is extended outwardly beyond the ring 5 and has at one end a block 9 which rubs on a ferrule 10 which belongs to the stator 4 and which is integral with the ring it surrounds with a relatively large radial space. The ferrule 10 advantageously coincides with the outer casing of the stator 4, as in this instance.

The friction surfaces 13 of the block 9, the ferrule 10 or both of them may be coated with a coating intended to lower their friction coefficient so as to avoid any seizing and for this purpose, molybdenum disulfide is recommended.

A similar result may be attained if the rubbing surfaces 13 are machined with slight unevenness. The rubbing force again depends on the caulking force on the rubbing surfaces 13, this rubbing force being able to be accurately calculated on the basis of the play separating them when at rest and the thermic dilations the pieces undergo. As the vanes 3 are directly exposed to the heat of the gases, they dilate much more than the ferrule 10.

Figure 2:
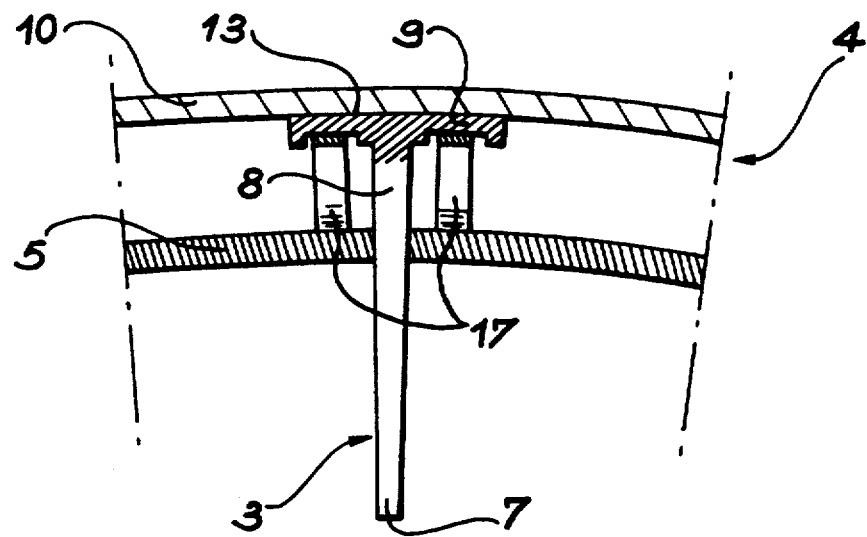
FIG. 2 shows the functioning of the invention.

The support of the block 9 on the ferrule 10 may also be obtained by a mechanical device, such as a spring or elastic plate 17 as shown in FIGS. 1 and 2.

Generally speaking, the blocks 9 are forged with the vanes 3 and thus form one part with the latter.

The main advantages of the invention are to slightly lighten the machine and avoid requiring any modification of the gas flow vein 6.

FIGS. 1 and 2 show that the blocks 9 are slightly curved, substantially rectangular plates whose two sides are equal to the width of the vanes 3, the other two sides being orientated in the direction of thickness of the vanes 3 corresponding to a significant widening of the latter.

Figure 3:
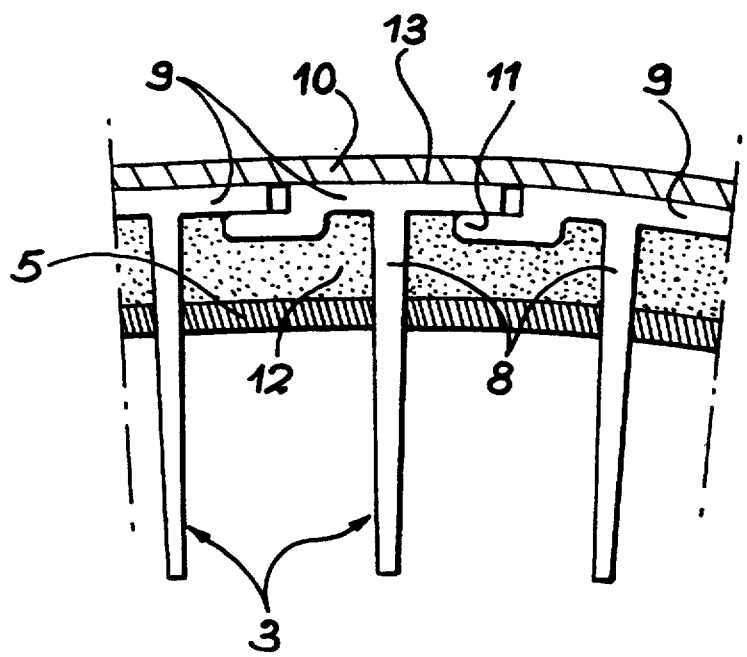
FIG. 3 represents another embodiment of the invention.

The blocks 9 are separated from one another by small intervals, as can be seen on FIG. 3, where the blocks 9 are moreover completed at one lateral extremity by lateral folds 11 which are portions intended to cover the opposing extremities of the neighbouring blocks 9 by also rubbing against on the latter, which increases the total dampening while offering direct interference between the vanes 3 which equalizes their movements.

The space 12 of the stator 4 between the ring 5 and the ferrule 10 may be filled with dampening material which completes the action of rubbing.

FIGS. 4A to 4E represent certain particular embodiments of blocks which so far have been represented in the form of plates with a constant thickness. However, it is preferable to have a block 9A (shown on FIG. 4A) whose rubbing surface 13 is notched with rectilinear and parallel grooves 14 extending in the direction of the circumference of the stage of vanes 3, that is in the direction of movement during the vibrations: the grooves 14 have the advantage of easily accomodating the smears laid on the ferrule 10 by the centrigufal forces and which could otherwise be introduced between the rubbing surfaces.

Figure 4:
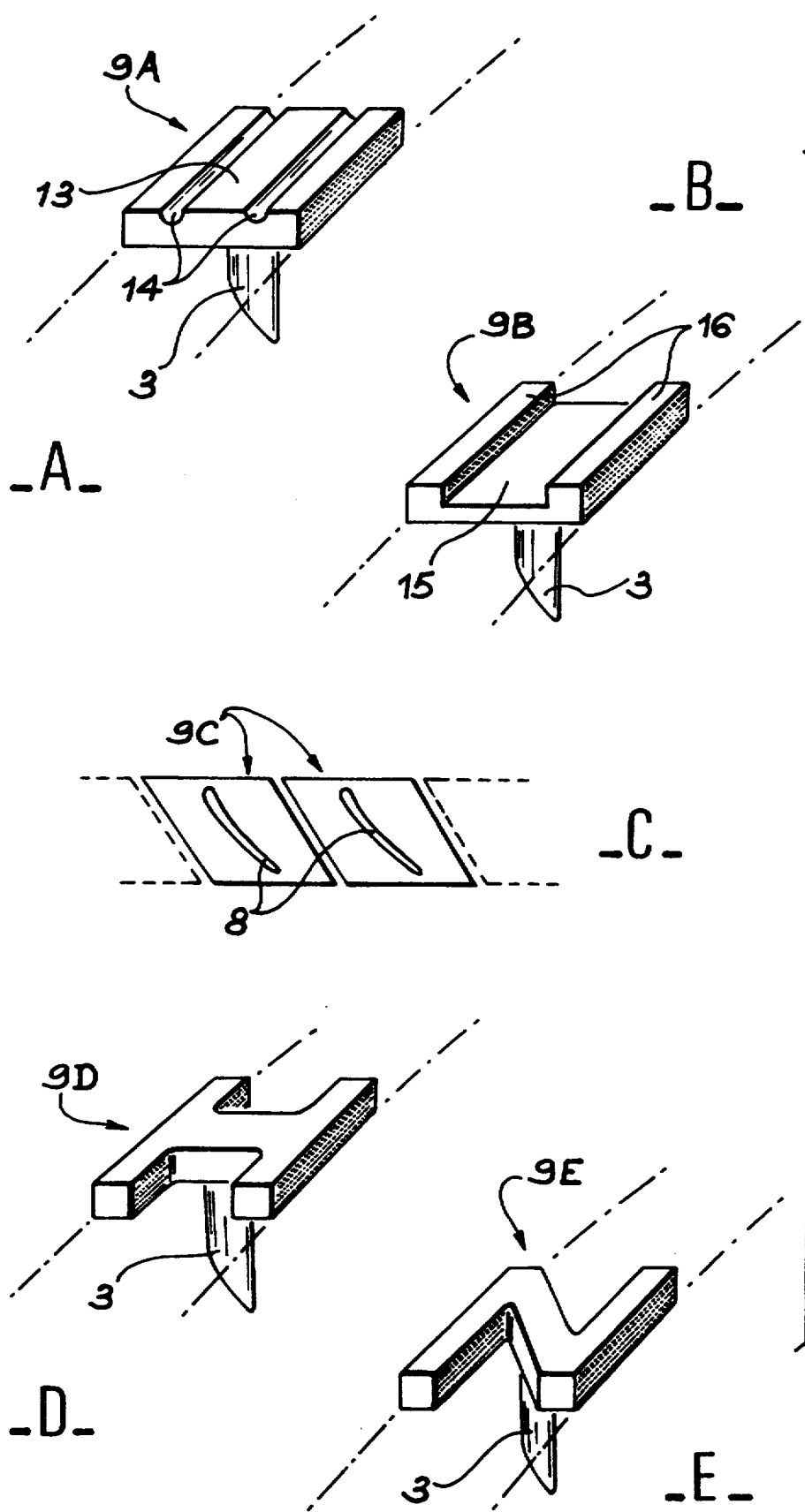
FIGS. 4A to 4E represent five other embodiments of the invention.

The block 9B of FIG. 4B exhibits a related shape but with a single central groove 15 and so wide that the rubbing surface is reduced to two extreme slide rails 16.

FIG. 4C represents a slightly different situation where the blocks 9C have a parallelogram shape whose oblique sides are roughly parallel to the vanes 3 and their basic portions 8. This disposition makes it possible to obtain a regular distribution of the rubbings.

The one 9D of FIG. 4D has an H shape and the one 9E of FIG. 4E has an N shape with the vane 3 joined to the crosspiece of the letter H or N whose stanchions are also directed in the direction of the circumference of the stage of vanes 3. These two embodiments, especially the latter one, are advantageous owing to the flexibility of the blocks 9D and 9E to the torsion deformations of the vane 3 which limits the stresses they undergo. The same advantage of reducing stresses could also be obtained for other blocks with a notched perimeter over the entire thickness.

The invention may therefore be implemented in a large number of ways, not all of these being mentioned in this text.

What is claimed is:

1. A stage of vanes, the vanes being embedded in a ring and which comprises:
   a ferrule concentric with the ring;
   said vanes having an outer portion which include a free extremity extending into a gas stream; and
   a base portion of the vanes extending beyond the ring with respect to the gas stream and having a respective block located at an opposite end, the block rubbing against the ferrule wherein one of the block and a surface of the ferrule have a coating for reducing friction.

2. A stage of vanes, the vanes being embedded in a ring and which comprise:
   a ferrule concentric with the ring;
   said vanes having an outer portion which includes a free extremity thereof extending into a gas stream; and
   a base portion of the vanes extending beyond the ring with respect to the gas stream and having a respective block located at an opposite end thereof, the block rubbing against the ferrule wherein the block has a friction surface with grooves formed therein.

3. A stage of vanes, the vanes being embedded in a ring and which comprise:
   a ferrule concentric with the ring;
   said vanes having an outer portion which includes a free extremity extending into a gas stream; and
   a base portion of the vanes extending beyond the ring with respect to the gas stream and having a respective block located at an opposite end thereof, the block rubbing against the ferrule wherein the block has a notched perimeter.

4. A stage of vanes according to claim 1, which comprises a dampening material which fills a space between the ring and the surface of the ferrule.

5. Stage of vanes according to claim 1, wherein the block contacts a neighboring block.

6. A stage of vanes according to claim 1, which comprises a plurality of springs wherein said springs bias said block against said ferrule.

7. A stage of vanes according to claim 2, which comprises a plurality of springs wherein said springs bias said block against said ferrule.

8. A stage of vanes according to claim 3, which comprises a plurality of springs wherein said springs bias said block against said ferrule.

9. A stage of vanes according to claim 2, wherein the block contacts a neighboring block.

10. A stage of vanes according to claim 3, wherein the block contact a neighboring block.

* * * * *